April 25, 1933.　　　J. H. SHERTS　　　1,905,189
PROCESS AND APPARATUS FOR MAKING COMPOSITE GLASS
Filed Aug. 11, 1930　　　4 Sheets-Sheet 2
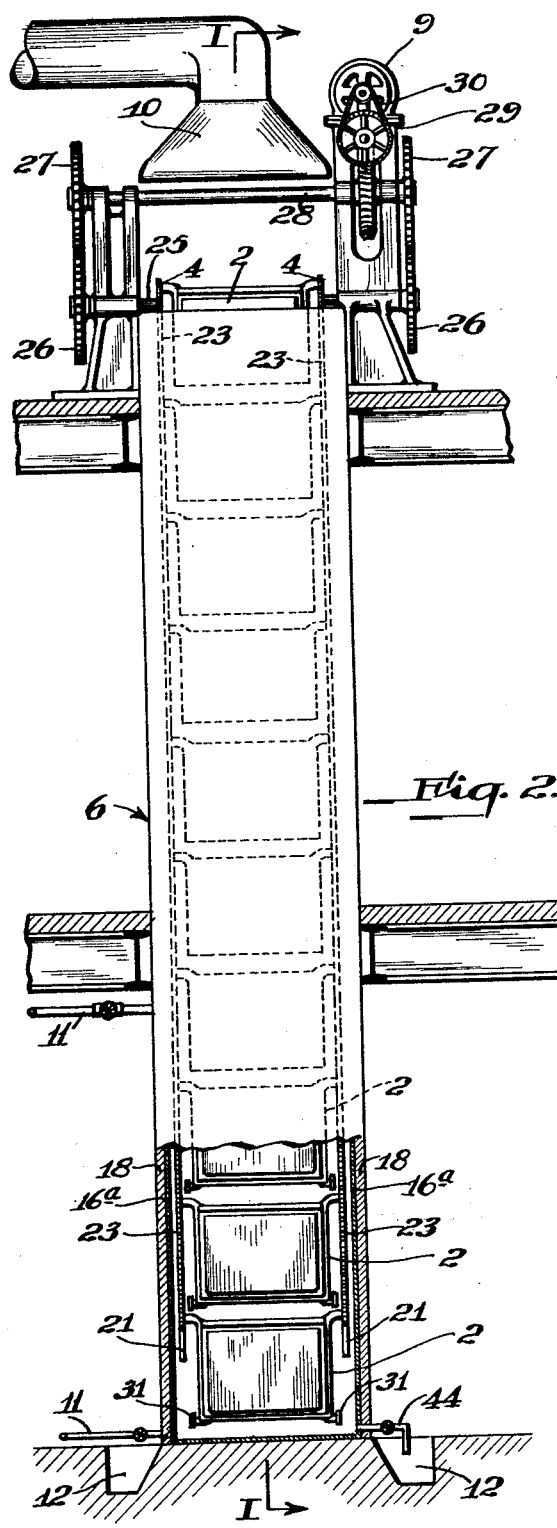
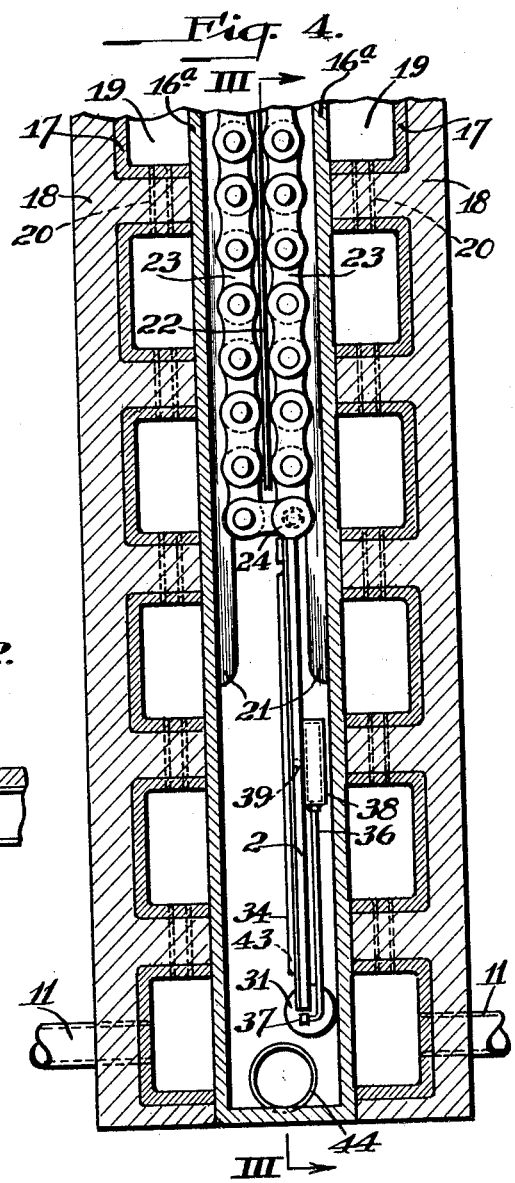
INVENTOR
James H. Sherts

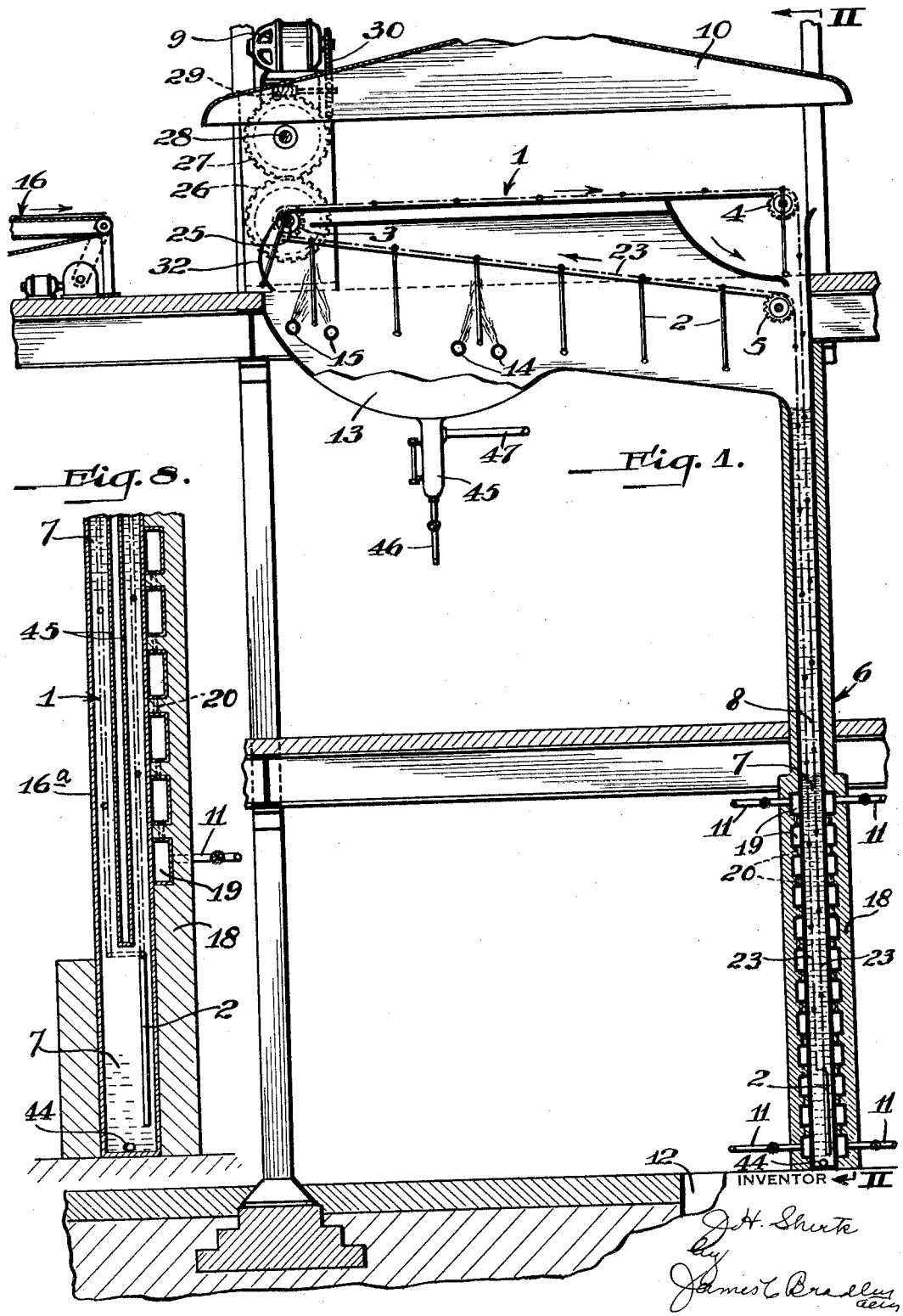

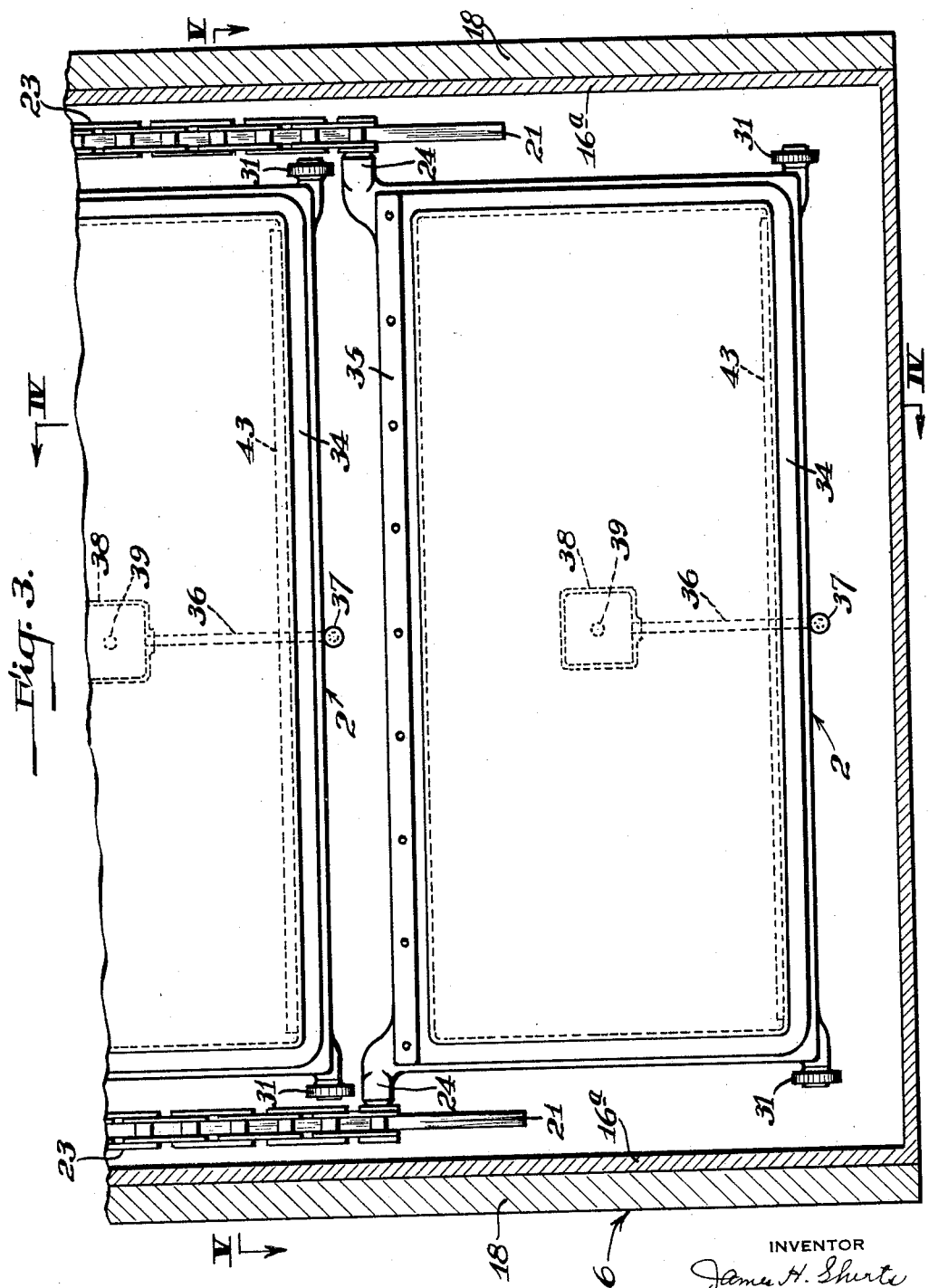

April 25, 1933. J. H. SHERTS 1,905,189
PROCESS AND APPARATUS FOR MAKING COMPOSITE GLASS
Filed Aug. 11, 1930 4 Sheets-Sheet 4
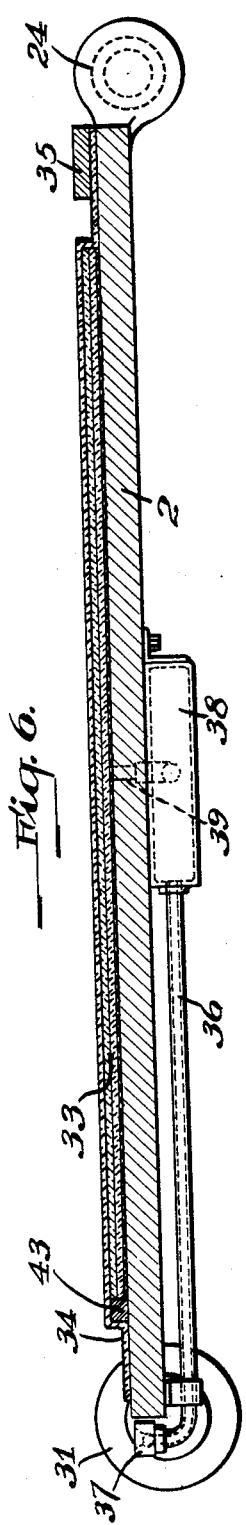
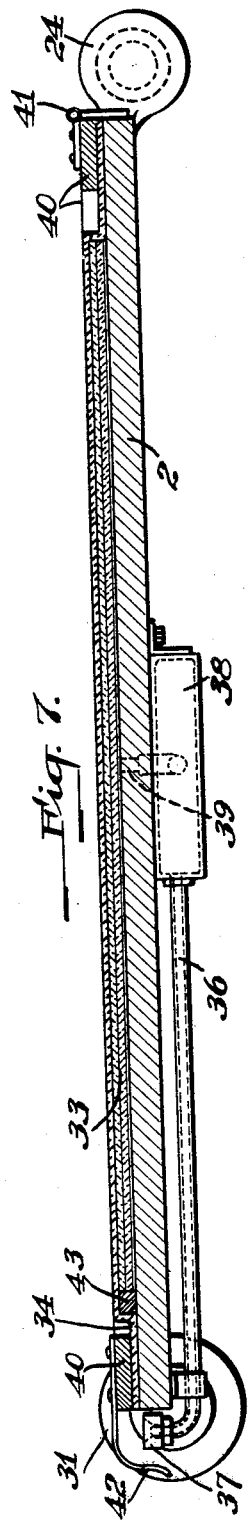
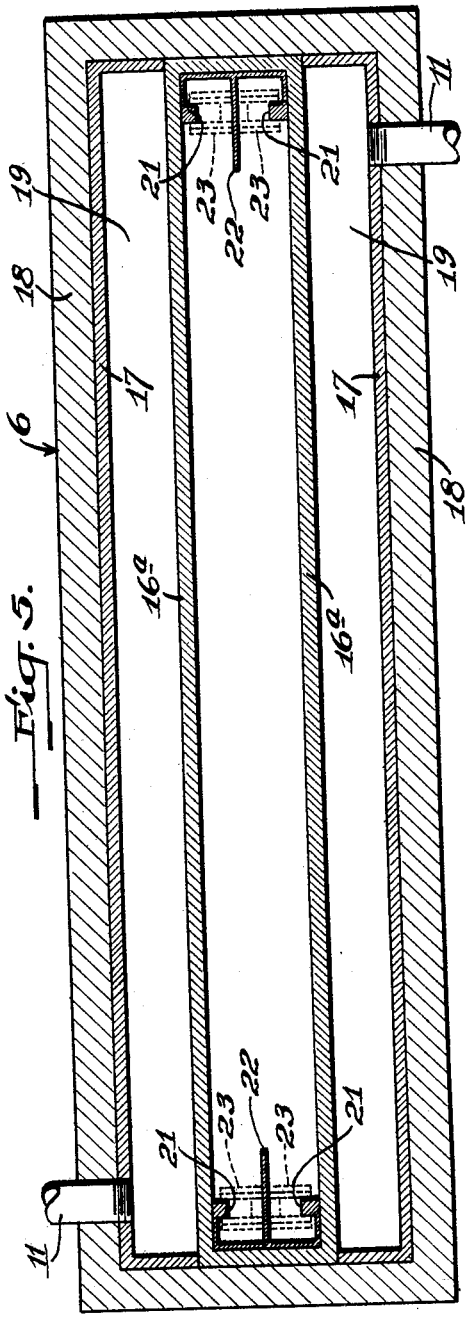
INVENTOR
James H. Sherts
By James L. Bradley
atty Patented Apr. 25, 1933

1,905,189

UNITED STATES PATENT OFFICE

JAMES H. SHERTS, OF BRACKENRIDGE, PENNSYLVANIA, ASSIGNOR TO DUPLATE CORPORATION, A CORPORATION OF DELAWARE

PROCESS AND APPARATUS FOR MAKING COMPOSITE GLASS

Application filed August 11, 1930. Serial No. 474,376.

The invention relates to a process and apparatus for making composite or safety glass, which glass ordinarily comprises two sheets of glass cemented to the opposite sides of a sheet of reinforcing material, such as pyroxylin plastic (celluloid). The compositing operation requires heat and pressure in order to insure a proper union between the sheets, the heat serving to soften the plastic sheet slightly, so that the pressure is effective to bring the opposing surfaces into intimate contact and remove any irregularities in the surface of the plastic. The heat also serves to make the cement sticky when such cement has been allowed to dry upon the sheets preliminary to compositing, as is ordinarily the case where gelatin, casein or similar cements are employed. The degree of heat and pressure will vary depending on conditions, but the pressure will in most cases range from 80 to 150 pounds per square inch and the heat applied will be such as to bring the plastic to a temperature of 200 degrees F. or slightly more. The present invention is designed to provide an improved means and apparatus for applying the necessary heat and pressure in order to composite the sheets which is continuous in its operation and requires a minimum of time and labor. Certain embodiments of the invention are illustrated in the accompanying drawings, wherein:

Figure 1 is a vertical section through the apparatus on the line I—I of Fig. 2. Fig. 2 is a vertical section through the apparatus on the line II—II of Fig. 1. Figs. 3, 4 and 5 are enlarged detail sections through the apparatus, Fig. 3 being a section on the line III—III of Fig. 4, Fig. 4 being a section on the line IV—IV of Fig. 3, and Fig. 5 being a section on the line V—V of Fig. 3. Fig. 6 is an enlarged detail section through one of the trays or containers employed. Fig. 7 is a view similar to Fig. 6 through a modification. And Fig. 8 is a section through another modification.

Referring to the general arrangement of the parts as shown in Figs. 1 and 2, 1 is an endless conveyor made up of two chains and carrying a series of trays or containers 2, such chains passing around the series of sprockets 3, 4 and 5; 6 is a vertical well carrying a bath of mercury 7 in its lower portion and a bath 8 of a lighter liquid in its upper portion into which well a series of containers 2 are lowered and removed by the conveyor; 9 is a motor by means of which the shaft carrying the sprockets 3 is driven through the intermediary of certain reduction gearing; 10 is an exhaust hood located above the horizontal flight of the conveyor; 11—11 are steam pipes by means of which the mercury in the lower portion of the well 6 is heated; 12 is a sump into which the well may be drained; 13 is a drain pan over which the containers pass after their movement from the well above which are located washing sprays 14 and drying sprays 15; and 16 is the end of a conveyor table for bringing the assembled sheets to a position adjacent the conveyor 1.

In carrying out the operation, the sheets of glass to be used in the composite plates are cleaned and provided with a coating of cement on one side, upon the conveyor 16, and a sheet of pyroxylin plastic, such as celluloid is placed between each pair of glass sheets so that a series of sets of three sheets are delivered upon the end of the conveyor 16 adjacent the conveyor 1. The end of the conveyor 16 is shown in alignment with the end of the conveyor 1, but may be placed in any suitable position to permit the operators to conveniently transfer the sets of sheets to the containers 2 of the conveyor 1. The sheets of glass are preferably cleaned upon the conveyor 16 by means of sprays of steam or hot water followed by drying sprays of hot air, but any suitable means may be employed for preparing the sheets for coating with adhesive, such means constituting no part of the present invention. The sets of sheets to be composited which are placed in the containers 2 of the carrier 1 are moved by the conveyor down into the bottom of the well 6 and then moved upward therefrom, the direction of movement of the conveyor 1 being indicated by the arrows. During this period of movement through the well 6, the sets of sheets are subjected to heat and pressure, the pressure being due to the hydraulic pressure in the well incident to its depth and being sufficient to composite the plate. If merely preliminary pressing is desired giving approximately 80 pounds per square inch, the column of mercury is made about 12 feet deep and is capped with a column of lighter liquid 8, such as diethylene glycol, about 6 feet deep. For complete pressing giving approximately a pressure of 160 pounds per square inch, the depth of the mercury and diethylene glycol bath is double. After the containers leave the bath 8, they pass over the drain pan 13 and are there washed with water from the sprays 14 and later dried by the hot air sprays 15. They are then moved to the horizontal flight of the conveyor where they are opened and the composited plates removed and other sets of sheets substituted preliminary to repeating the cycle.

The construction of the lower portion of the well 6, which is designed to carry and heat the mercury 7, is preferably as indicated in Fig. 4. The sides of the well comprise the steel plates 16ª, 16ª, to which are welded the transverse channels 17 surrounded by the insulating material 18. The channels 17 provide passages for steam for heating the mercury bath. The steam is supplied by the pipes 11 which are connected to the passages 19 formed between the channels and the plates 16. The series of passages are all connected together by means of the vertical passages 20 so that a circulation of steam is provided on each side of the well from the upper steam pipes 11 to the lower steam pipes. In this manner the mercury is maintained at a temperature of about 240 degrees F. The mercury chamber is provided at its edges with a pair of guides 21, 21 for receiving the chains of the conveyor 1 and also with the vertical spacers 22, 22 for separating the two vertical flights of each chain.

The conveyor 1 is made up of the chains 23, 23 (Figs. 3 and 4) connected at intervals by the brackets 24, 24 mounted upon the edges of the trays or containers 2. The sprockets 3 which drive the conveyor are mounted upon a shaft 25 to which is keyed the spur gears 26. The gears 26 are driven from the gears 27 on the shaft 28. The shaft 28 also carries a worm wheel which is driven from a worm 29, such worm being driven from the motor 9 through the intermediary of the chain 30 passing around sprockets on the shaft of the worm and the motor drive shaft. The two vertical flights of the chains which lie in the well 6 merely turn back upon each other at their lower ends, as indicated in Fig. 4, so that no sprockets are required at this point, thus permitting the well to be made of a minimum width. The edges of the containers 2 remote from the brackets 24, 24 (Fig. 3) are provided with rollers 31, 31 fitting into the guides 21, 21 in the mercury chamber (Fig. 5) and when the containers reach a point adjacent the sprockets 3, these rollers 31, 31 are engaged by the cam members 32 (Fig. 1), so that the container is guided to horizontal position as the chains move around the sprockets 3.

The containers 2 are provided with recesses upon their upper sides, as indicated in Fig. 6, for receiving the sheets 33 to be composited, such sheets comprising the pair of glass sheets with an interposed reinforcing sheet with the opposing faces of the sheets prepared for adhesion upon the application of heat and pressure. A closure for the container is provided in the form of the thin sheet of rubber 34 secured along one edge to the plate 2 by means of the binding strip 35. Means are provided for exhausting the air from the space beneath the sheet 34 in the form of the exhaust pipe 36 having the valve 37 at its end. This pipe communicates with a vacuum box 38 which in turn communicates with the space beneath the cover 34 by means of the connection 39. After each set of sheets is placed in the container and the cover 34 is applied, an exhausting device is connected at 37 and the air in the container and in the box 38 is exhausted. The use of the box 38 is advantageous as it assists in maintaining vacuum even though a slight leakage occurs beneath the cover 34. The application of vacuum to the container before the pressing operation facilitates such pressing operation as it tends to remove any air which is entrapped between the opposing surfaces of the sheets to be composited.

Fig. 7 of the drawings illustrates a modification in which the flexible sheet 34 is carried by a rectangular frame 40, hinged at 41 to the plate 2 and provided with a handle 42. This form of cover is somewhat easier to open than the cover shown in Fig. 6 without the frame, the cover shown in Fig. 6 being preferably removed to expose the set of sheets by rolling it back upon itself.

In operation, the conveyor 1 is moved at a rate of speed such that the cycle of immersion of the containers in the well 8 is about 10 minutes in case a complete pressing operation is desired, the operation of the conveyor preferably being a continuous one. This rate of movement gives plenty of time for the operators to unload the containers when they reach the horizontal flight of the conveyor and to reload them with sets of sheets to be composited. After the cover is placed over each set of sheets, the operator applies an exhaust device to the connection 37, thus exhausting the air from the space beneath the cover 34 and pressing such cover down tightly upon the sheets so that there is little tendency for them to move during the cycle of operations. In order to still further guard against slippage of the sheets inside the container during the vertical movement thereof, a rib 43 (Fig. 6) is provided along one side of the plate 2 for engaging the lower edges of the sheets.

The use of the bath 8 of diethylene glycol above the mercury 7 is advantageous in that the liquid 8 prevents volatilization of the mercury with a consequent elimination of its vapor poisoning effects. It also serves to wash the mercury from the plates and chain while they are being pulled upward through the bath. The diethylene glycol is used because of its neutral character and high boiling point, but it will be understood that any liquid might be substituted which had these characteristics. The diethylene glycol may be readily washed off with water by the sprays 14 and the containers then dried, the equipment in this manner being kept clean and dry for charging and recharging. The bath 8, being unheated and subject to cooling by the incoming containers and plates, is maintained at a relatively lower temperature than the mercury bath 7, so that the containers and their contents are not too rapidly heated when they enter the bath and have an opportunity to cool somewhat from their highest temperature before leaving the bath.

The avoidance of sprockets at the lower ends of the chains 23 (Fig. 4) is advantageous as it permits of the reduction of the cross section of the mercury chamber to a minimum, thus decreasing the cost of mercury which is a large item of expense. There is considerable upthrust in the mercury bath against the chain and the containers due to the difference in specific gravity of these parts as compared with the mercury, but this is offset by the downward thrust due to the weight of the conveyor guided in the members 21, 21 (Fig. 5), so that no difficulty is experienced in moving the chains and containers to the bottom of the mercury chamber.

A further feature of advantage incident to the use of the mercury well as a passing device is due to the fact that a progressively increasing pressure is applied to the plates as they move downward through the diethylene glycol and mercury. This progressive pressure will tend to gradually force air outward from between the plates in an upward direction, thus doing away with the tendency to include trapped air between the plates which is encountered in the ordinary pressing operation. It will be understood that the purpose of the closure sheet 34 is to prevent application of the liquid in the joints between the sheets which would prevent proper compositing, and any other suitable means might be employed which would accomplish this function. The use of the sheet 34 for this purpose is preferred as it is easily applied and removed and when the air is exhausted from beneath this sheet, the pressure of the atmosphere tends to hold the plates securely together and against movement without the use of additional holding means as heretofore pointed out.

The mercury may be drained from the mercury chamber when desired through the outlet 44 (Fig. 2). Any mercury which is carried along by the chains and containers and is not washed off in the bath 8 is caught in the drain pan 13 (Fig. 1) and collected in the bottom of the cup 45. This may be withdrawn from time to time through the outlet pipe 46. The diethylene glycol which collects in the pan 13 and cup 45 may be removed through the connection 47.

Fig. 8 illustrates a modified well construction designed to permit the containers 2 and their contents to cool to a greater extent during the period of their upward movement through the bath. To this end, the heating passages are provided on one side of the well only and extend only part way to the bottom of the well. On the other side of the well the metal plate is exposed to the atmosphere to promote cooling of the bath and a hollow partition 45 is provided between the two sides of the well which reduces the heat transmission from the hot side of the well to the cooler side. This arrangement permits the composited plates to cool down to a greater extent while still under pressure, thus reducing the tendency to produce bubbles between the glass sheets and the plastic.

What I claim is:

1. A process of compositing glass and a reinforcing sheet, which consists in assembling a pair of glass sheets with a reinforcing sheet therebetween with their opposing surfaces prepared for adhesion upon the application of heat and pressure, and moving the assembled sheets down into a heated bath of metal to a depth sufficient to composite the sheets by the pressure produced in the bath by gravity, the edges of the sheets being shielded from contact with the bath during such movement into the bath.

2. A process of compositing glass and pyroxylin plastic sheets which consists in assembling a pair of glass sheets with a pyroxylin plastic sheet therebetween with their opposing surfaces prepared for adhesion upon the application of heat and pressure, moving the sheets down into a heated bath of mercury to a depth sufficient to composite the sheets by the pressure produced in the mercury by gravity, the edges of the sheets being shielded from contact with the mercury during said movement into the liquid.

3. A process of composition glass and reinforcing sheets, which consists in assembling a pair of glass sheets with a sheet of reinforcing material therebetween, placing the assembled sheets in a container having a flexible side and moving the container down into a heated bath of metal to a depth sufficient to composite the sheets by the pressure produced in the liquid by gravity.

4. A process of compositing glass and reinforcing sheets, which consists in assembling a pair of glass sheets with a sheet of pyroxylin plastic and layers of cement therebetween, placing the assembled sheets in a container having a flexible side, and moving the container down into a heated bath of mercury to a depth sufficient to composite the sheets by the pressure produced in the mercury by gravity.

5. In apparatus for making composite glass from a plurality of sheets, a mercury bath, means for heating such bath, a conveyor movable down into the bath to a depth sufficient to composite the sheets by the hydrostatic pressure incident to gravity and then out of the bath, a flat container secured to the conveyor having a rigid side, a flexible side and adapted to carry a plurality of sheets to be composited, and means for moving the conveyor.

6. In apparatus for making composite glass from a plurality of sheets, a mercury bath, a bath of a liquid lighter than the mercury on top of the mercury bath, means for heating the mercury, a conveyor movable down through both liquids to a depth sufficient to composite the sheets by the hydrostatic pressure incident to gravity and then upward out of the liquids and a flat container for the glass having a flexible side secured to the conveyor.

7. In apparatus for making composite glass from a plurality of sheets, a mercury bath, means for heating such bath, a conveyor movable down into the bath to a depth sufficient to composite the sheets by the hydrostatic pressure incident to gravity and then out of the bath, a flat container secured to the conveyor having a removable rubber sheet constituting one side thereof and adapted to carry a plurality of sheets to be composited, means for exhausting the air from the container, and means for moving the conveyor.

8. In apparatus for making composite glass from a plurality of sheets, a mercury bath, means for heating such bath, an endless conveyor having a horizontal flight and a vertical flight extending down into the bath to a depth sufficient to composite the sheets by the hydrostatic pressure incident to gravity and then out of the bath, a flat container secured to the conveyor having a flexible side and adapted to carry a plurality of sheets to be composited, and means for moving the conveyor.

9. In apparatus for making a composite glass from a plurality of sheets, a liquid bath of metal, means for heating such bath, a conveyor movable down into the bath to a depth sufficient to composite the sheets by the hydrostatic pressure incident to gravity and then out of the bath, a flat container secured to the conveyor having a flexible side and adapted to carry a plurality of sheets to be composited, and means for moving the conveyor.

10. In apparatus for making composite glass from a plurality of sheets, a mercury bath, means for heating such bath, an endless conveyor having a horizontal flight and a vertical flight extending down into the bath to a depth sufficient to composite the sheets by the hydrostatic pressure incident to gravity and then out of the bath, a series of containers secured to the conveyor each having a flexible side and adapted to carry a plurality of sheets to be composited and means for moving the conveyor to carry the containers through the bath one after the other.

11. In apparatus for making composite glass from a plurality of sheets, a mercury bath, means for heating such bath, an endless conveyor having a horizontal flight and a vertical flight extending down into the bath to a depth sufficient to composite the sheets by the hydrostatic pressure incident to gravity and then out of the bath, said conveyor comprising a pair of chains, a series of flat containers for carrying the sheets to be composited, each hinged at one edge between the chains so as to hang in vertical position during the travel of the conveyor into and out of the bath and each having a rubber sheet as the closure of one side of the container, and means for moving the conveyor to carry the containers through the bath one after the other.

12. In apparatus for making composite glass from a plurality of sheets, a mercury bath, a bath of a liquid which is non-volatile, high boiling and lighter than mercury, on top of the mercury bath, means for heating the mercury, a conveyor movable down through both liquids and then upward out of the liquid and a flat container for the sheets to be composited secured to the conveyor and having a flexible side.

In testimony whereof, I have hereunto subscribed my name this 7th day of July, 1930.

JAMES H. SHERTS.